Aug. 18, 1964 U. F. GIANOLA 3,145,370
MULTIAPERTURED MAGNETIC CORES
Filed June 25, 1962 4 Sheets-Sheet 1

INVENTOR
U. F. GIANOLA
BY Lucian C. Canepa
ATTORNEY

INVENTOR
U. F. GIANOLA
BY Lucian C. Canepa
ATTORNEY

MULTIAPERTURED MAGNETIC CORES

Filed June 25, 1962 4 Sheets-Sheet 3

INVENTOR
U. F. GIANOLA
BY Lucian C. Canepa
ATTORNEY

Aug. 18, 1964 U. F. GIANOLA 3,145,370

MULTIAPERTURED MAGNETIC CORES

Filed June 25, 1962 4 Sheets-Sheet 4

INVENTOR
U. F. GIANOLA
BY Lucian C. Canepa
ATTORNEY

United States Patent Office 3,145,370
Patented Aug. 18, 1964

3,145,370
MULTIAPERTURED MAGNETIC CORES

Umberto F. Gianola, Florham Park, N.J., assignor to Bell Telephone Laboratories, Incorporated, New York, N.Y., a corporation of New York Filed June 25, 1962, Ser. No. 204,682
5 Claims. (Cl. 340—174)

This invention relates to the processing of digital information signals, and more particularly to magnetic devices and circuits for processing such signals.

Circuits composed as far as possible of compatible rectangular loop magnetic devices, and having a capacity for memory, gain and unidirectionality, have many advantages which make them attractive as elements of information processing systems. These advantages include the relatively low cost, small size, and high reliability of such magnetic devices as, for example, ferrite cores.

In one type of information processing circuit, signals are propagated in a step-by-step fashion along directed paths of a network of bit storage locations without signal degradation. One approach to the design of magnetic circuits of this type involves interconnecting a number of simple toroidal cores by means of wires and associated components such as diodes. However, this approach frequently results in considerable wiring complexity. The wiring required and the number of associated components needed in this general type of core circuit can often be reduced, and its efficiency increased, by using more complicated magnetic devices such as multiapertured cores, for example, those of the type disclosed in my copending application Serial No. 822,907, filed June 25, 1959, now Patent 3,045,215, issued July 17, 1962.

The above-cited application describes a novel magnetic shift register circuit each stage of which includes two two-hole cores and two inter-core coupling windings. Experience has shown that the cost of placing coupling windings between the cores of such circuits represents a substantial part of their cost. In addition, coupling windings dissipate power and thereby decrease the efficiency of the circuits. Therefore, there is considerable merit to any approach that can reduce the total number of inter-core windings needed. Also, it is frequently advantageous, from the standpoint of ease of assembling these circuits, to reduce the total number of individual cores required therein.

Accordingly, it is an object of the present invention to provide improved magnetic devices and circuits.

More specifically, it is an object of this invention to provide an improved multiapertured magnetic core device from which may be constructed simple and efficient magnetic circuits.

Another object of the present invention is an efficient magnetic circuit characterized by memory, gain, and unidirectionality.

A further object of this invention is a one-core-per-stage magnetic circuit in which signals are advanced in a step-by-step manner and in which part of the advance sequence is carried out by flux transfers within the core itself, whereby the number of cores and inter-core coupling windings required in the circuit are thereby reduced.

These and other objects of the present invention are realized in a specific illustrative embodiment thereof which comprises a multistage magnetic shift register circuit each stage of which includes a three-hole magnetic core. The holes in each core and the flux paths defined by various cross-sectional areas thereof are so proportioned that in response to an applied four-phase clock signal sequence, the flux condition of each core is transferred via a single interstage coupling winding to the core in the next adjacent stage of the embodiment.

An illustrative core made in accordance with the principles of this invention comprises a body of material exhibiting a rectangular hysteresis loop characteristic. The three holes therethrough define four substantially parallel flux-carrying legs, the minimum cross-sectional areas of the legs being substantially equal to each other. The body also includes two side members respectively interconnecting the ends of the four substantially parallel legs to form a plurality of closed magnetic paths in the body, the portions of the side members which interconnect the two middle legs having a minimum cross-sectional area substantially equal to twice that of each of the legs.

A feature of the present invention is that a magnetic core include three holes therethrough to define four substantially parallel flux-carrying legs, the minimum cross-sectional areas of the legs being substantially equal to each other, and that the core include side members interconnecting the four substantially parallel legs to form a plurality of closed magnetic paths, the portions of the side members which interconnect the two middle legs having a minimum cross-sectional area substantially equal to twice that of each of the legs.

Another feature of this invention is that each stage of a magnetic shift register include a single multiapertured core and a single inter-core coupling winding.

Still another feature of the present invention is that a magnetic shift register circuit include a single multiapertured core and one inter-core coupling winding per stage, and that the circuit be responsive to a four-phase clock signal sequence by propagating information through the circuit from stage to stage in a step-by-step manner.

A complete understanding of the present invention and of the above and other features and advantages thereof may be gained from a consideration of the following detailed description of an illustrative embodiment thereof taken in conjunction with the accompanying drawing, in which.

Figure 1A:
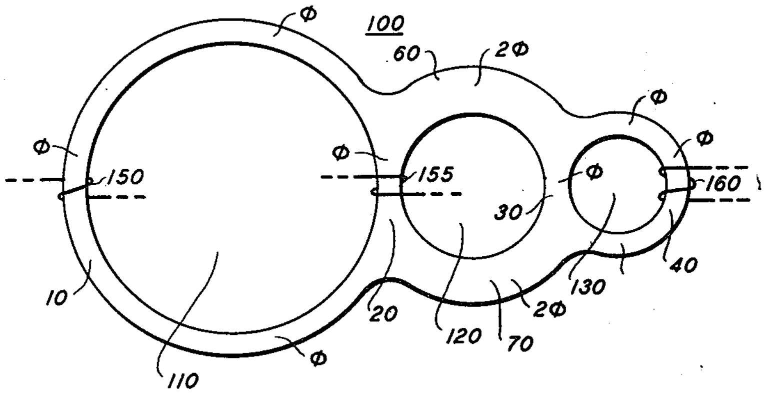
FIG. 1A depicts a specific illustrative magnetic core device made in accordance with the principles of the present invention.
Figure 2A:
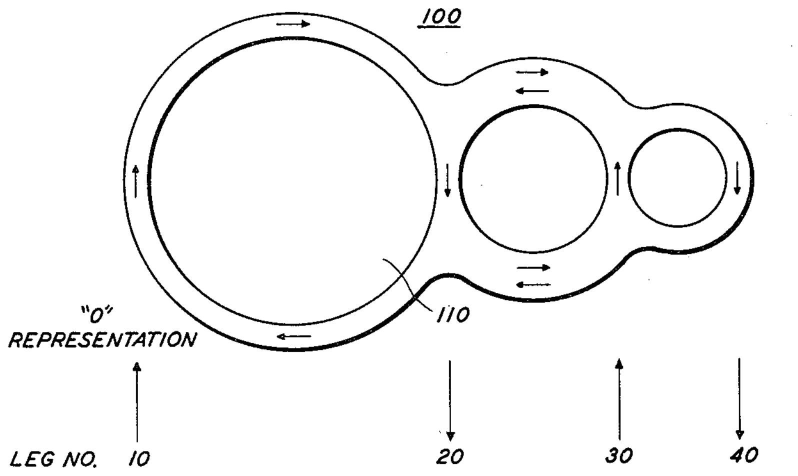
Figure 2B:
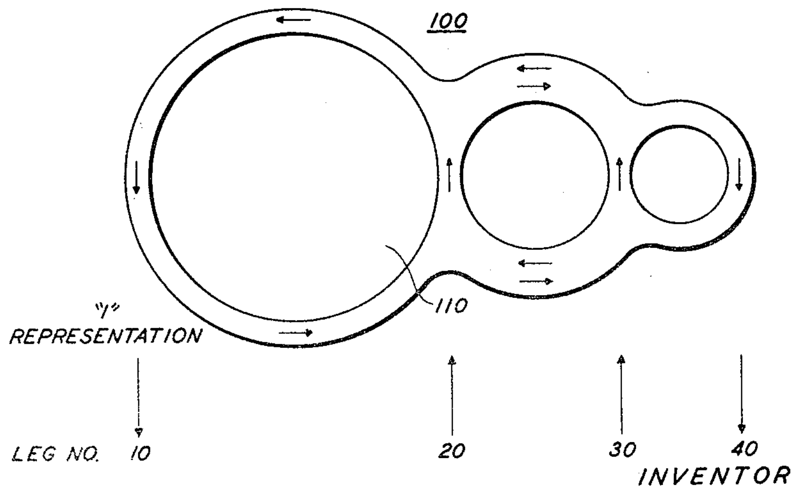
Figure 3:
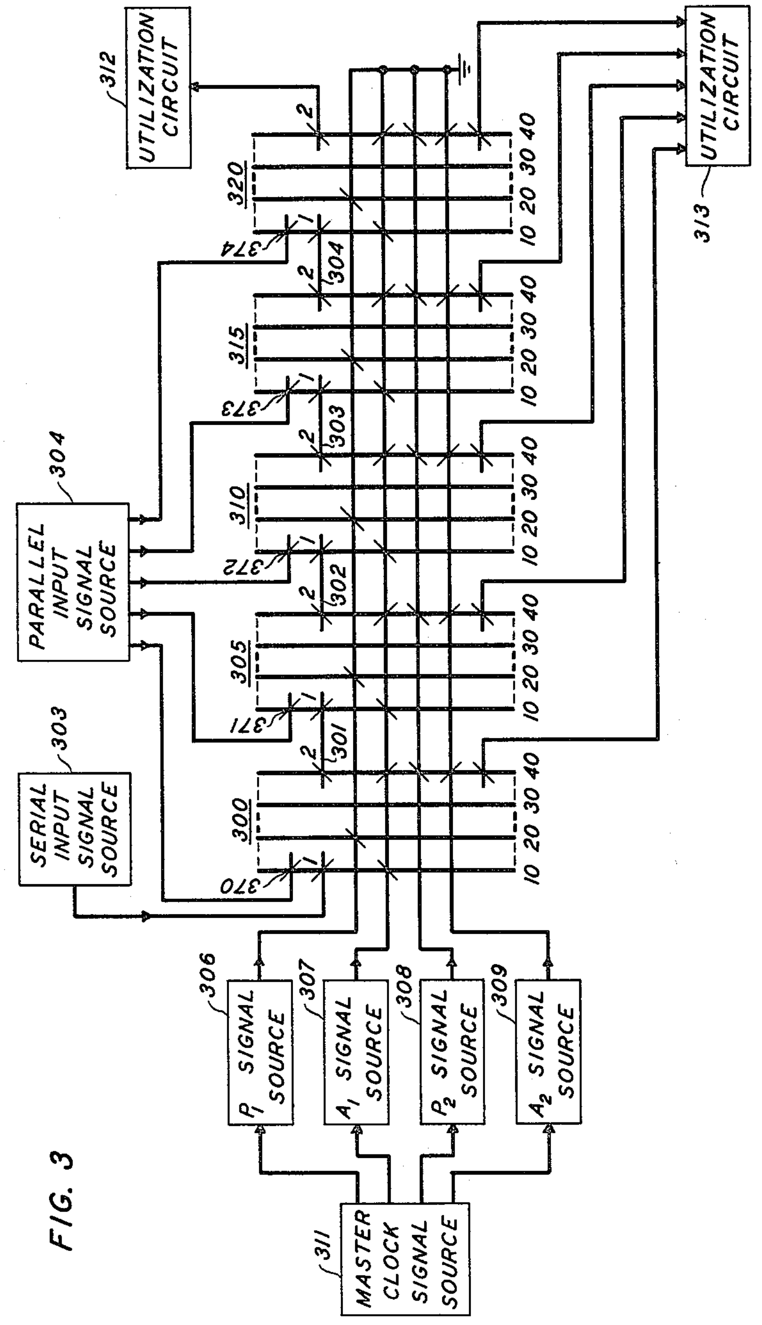
Figure 4:
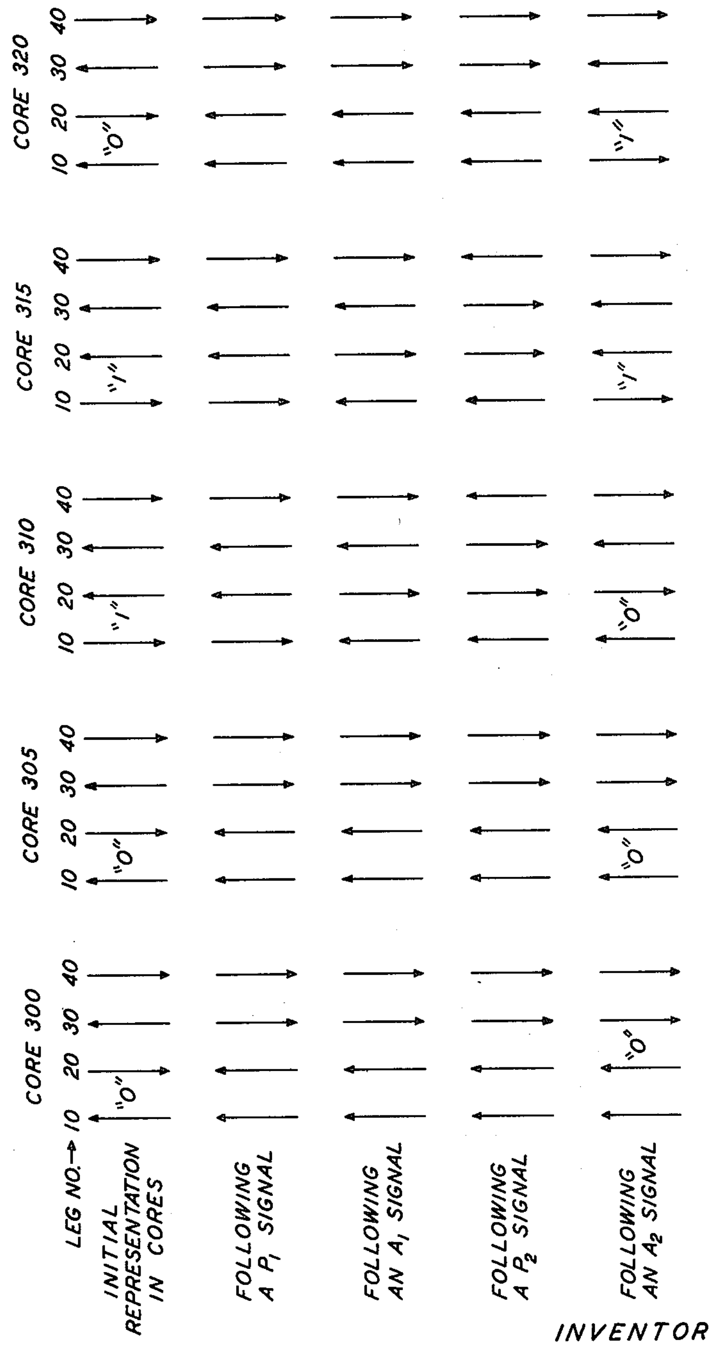

FIGS. 2A and 2B each illustrate a core of the type shown in FIG. 1A and, further, indicate the flux conditions thereof illustrative of the binary representations "0" and "1," respectively;

FIG. 3 shows in symbolic form a magnetic shift register circuit made in accordance with the principles of the present invention; and FIG. 4 illustrates, for a complete cycle of operation of the circuit shown in FIG. 3, the flux conditions of the cores thereof in response to signals from a four-phase clock signal source.

Referring now to FIG. 1A, there is shown a core 100 made of a ferromagnetic or ferrimagnetic material that has a substantially rectangular hysteresis loop characteristic. The core 100 includes therethrough three apertures 110, 120, and 130 whose relative dimensions are specified in detail later hereinbelow. The apertures define four parallel vertically-oriented legs 10, 20, 30, and 40 and, in addition, two generally horizontal side members 60 and 70 which respectively interconnect the ends of the four parallel legs and thereby form therewith a plurality of closed magnetic paths.

The minimum cross-sectional areas of the vertical legs 10, 20, 30, and 40 of the core 100 shown in FIG. 1A are selected to be approximately the same and may each be regarded as having a flux-carrying capacity of $\varphi$ flux units. By contrast, that portion of the side member 60 which interconnects the top ends of the legs 20 and 30, and that portion of the side member 70 which interconnects the bottom ends of the legs 20 and 30, are each dimensioned to have a flux-carrying capacity of at least $2\varphi$ flux units. On the other hand, those portions of the side member 60 which interconnect the top ends of the legs 10 and 20, and the top ends of the legs 30 and 40, are each dimensioned to have a minimum flux-carrying capacity of $\varphi$ flux units. Also those portions of the side member 70 which interconnect the bottom ends of the legs 10 and 20, and the bottom ends of the legs 30 and 40, are each dimensioned to have a minimum flux-carrying capacity of $\varphi$ flux units. The above-specified flux capacities of the vertical legs 10, 20, 30, and 40, and of the various portions of the side members 60 and 70, are indicated in FIG. 1A.

For illustrative purposes windings 150, 155, and 160 are shown in FIG. 1A as being inductively coupled to the vertical legs 10, 20, and 40, respectively. The winding 150 is arranged on the leg 10 in a sense such that a current flow into the upper end of this winding and out of the lower end thereof will tend to drive flux downward in the leg 10. The winding 155 is arranged in a sense opposite to that of the winding 150. Therefore, a current flow into the upper end of the winding 155 and out of the lower end thereof will tend to drive flux upward in the leg 20. Illustratively, the winding 160 is a coupling winding and is wound such that a reversal in the magnetization of leg 40 from an upward to a downward direction will induce a current in the winding 160 which will flow out of the upper end and into the lower end thereof.

Figure 1B:
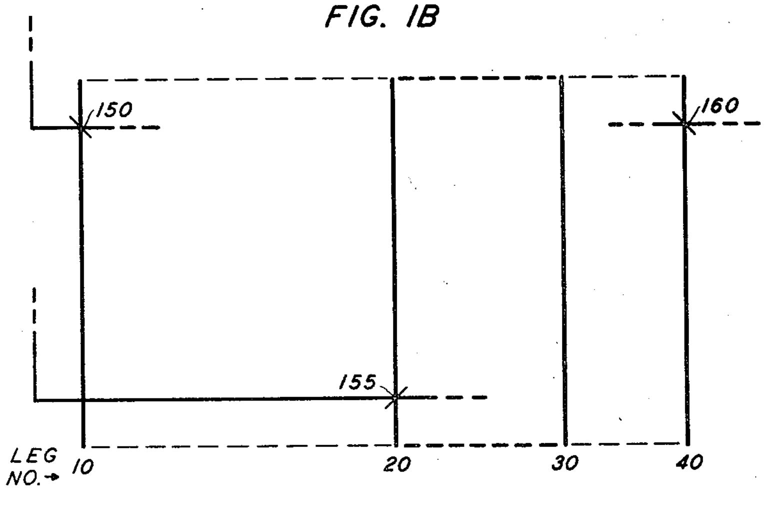
FIG. 1B is a symbolic representation of the core shown in FIG. 1A.

Before proceeding to a specific discussion of FIG. 1B, it is noted by way of background that the schematic representation of magnetic circuits is considerably facilitated by the use of mirror symbols. This type of symbology is clearly described in "Pulse Switching Circuits Using Magnetic Cores," by M. Karnaugh, pages 570–584, Proceedings of the Institute of Radio Engineers, May 1955, volume 43.

In accordance with the symbology described in the Karnaugh article, magnetic cores are represented by heavy vertical line segments, winding leads are represented by horizontal line segments, and winding turns are represented by 45-degree mirror symbols at the intersections of the vertical cores and horizontal leads. The sense of the magnetic field associated with a current in a given winding is obtained by reflecting the current in the winding mirror symbol. To find the direction of the electromotive force induced in a winding when the applied field switches a core, reverse this field and reflected it in each winding mirror symbol. These conventions are completely consistent with Lenz's Law.

The application of a current pulse in a given direction to a first type of winding which is wound around a core in one direction and is represented by a 45-degree mirror symbol that extends into the first and third quadrants, causes the core to switch to one magnetic state, while the application of a similarly-directed pulse to a second type of winding which is wound around the core in the opposite direction and is represented by a 45-degree mirror symbol that extends into the second and fourth quadrants, causes the core to switch to its other stable magnetic state. In switching from one to the other of its two stable states, a core experiences a magnetic flux reversal which induces a voltage of one polarity in the first type of core winding and a voltage of the opposite polarity in the second type of core winding.

Herein a slightly modified mirror symbol representation will be used to describe cores of the FIG. 1A type and circuits made therefrom. The modified representation is shown in FIG. 1B wherein each leg of the core 100 is represented by a heavy vertical line whose width is proportional to the flux-carrying capacity thereof. Since the flux-carrying capacities of the legs 10, 20, 30, and 40 are substantially equal to each other, the vertical lines respectively representative thereof are depicted as being equal in width. The horizontal dashed lines are included in FIG. 1B to draw attention to the fact that the vertical legs are interconnected magnetically by the side members 60 and 70, thereby forming a plurality of closed magnetic paths. In particular, it is noted that the horizontal dashed lines which interconnect the tops and bottoms of the legs 20 and 30 are shown in FIG. 1B as being twice as wide as any of the other dashed lines thereof, thereby to indicate that those portions of the side members 60 and 70 each have a flux-carrying capacity of $2\varphi$ units. Also shown in FIG. 1B in symbolic form are the windings 150, 155, and 160 depicted in FIG. 1A.

The flux distributions in a multiapertured core device of the type shown in FIG. 1A can be easily determined if the following two facts are kept in mind. First, flux continuity must be preserved. Second, when a magnetomotive force exceeding a predetermined threshold value is applied to a leg, a preferential flux reversal will first take place in that flux path which includes the leg and which presents the lowest reluctance to the applied force. In general the lowest reluctance path is the shortest path having flux available for reversal.

In accordance with the principles of the present invention, the flux distributions in a core device of the type shown in FIG. 1A may assume a number of discrete patterns. Two of these distributions, specifically those which will be considered representative of the binary values "0" and "1," are illustrated in FIGS. 2A and 2B, respectively, wherein arrows indicate the states of remanent magnetization of the vertical legs 10, 20, 30, and 40 and, also, of the various portions of the side members 60 and 70. Each arrow represents a magnetization of one flux unit. Thus in FIGS. 2A and 2B each of the legs 10, 20, 30, and 40 is indicated to be magnetized either in an upward or a downward direction in the amount of one flux unit. Those portions of the side members 60 and 70 which interconnect the upper and lower ends of the vertical legs 20 and 30 each contain two opposed arrows, thereby indicating a zero resultant magnetization for each of those portions.

It should be kept in mind that the flux patterns shown in FIGS. 2A and 2B are merely convenient representations and that the actual magnetic domain structures of the various regions of the core 100 will, in fact, be considerably more complicated than indicated. Nevertheless, the model is in general helpful and for present purposes completely adequate.

It is noted that the "0" and "1" representations shown in FIGS. 2A and 2B, respectively, differ only in the flux states of the two left-hand legs 10 and 20. Specifically, in the "0" flux pattern of FIG. 2A, the leg 10 is magnetized in an upward direction and the leg 20 in the downward direction, while in the "1" flux pattern shown in FIG. 2B the converse is true. (Actually, as discussed in detail hereinbelow, the initial settings of the legs 20 and 30 in a "0" core may be respectively opposite to the magnetizations indicated in FIG. 2A; therefore, it is the upwards magnetization of the leg 10 that is in general determinative of a core being representative of a "0" state, and it is the downwards magnetization of the leg 10 that is in general determinative of a core being representative of a "1" state.) Thus, to switch the core 100 from a "0" representation to a "1" simply requires that the clockwise magnetization around the periphery of the largest or input hole 110 be switched to a counterclockwise orientation. This may be done, for example, by applying a positive switching current to the upper end of the winding 150 shown in FIG. 1A. In practice this switching current could be applied to the leg 10 via a coupling winding that interconnects the leg 10 with the leg 40 of a preceding core device in an array of such devices, and could be induced by the flux change produced by switching the leg 40 of the preceding core.

In accordance with the principles of the present invention, magnetic memory devices of the type described above and shown in FIGS. 1A, 2A, and 2B may be interconnected in an array through which signals are propagated along directed paths in a step-by-step fashion without signal degradation. The proper operation of such arrays depends on the core flux patterns thereof being changed or shifted in an ordered manner. This, in turn, depends on selectively driving each core with multiphase signals whose amplitudes are controlled relative to the switching thresholds characteristic of the various flux paths in the core. By these techniques the number of cores and inter-core coupling windings required in such arrays are minimized.

Turning now to FIG. 3, there is shown a specific illustrative shift register circuit made in accordance with the principles of the present invention. The circuit includes five core devices 300, 305, 310, 315, and 320, each of which is depicted in FIG. 3 in accordance with the mirror symbology described above in connection with FIG. 1B. Each core included in the FIG. 3 circuit is of the type shown in FIGS. 1A, 2A, and 2B. Each vertical leg except leg 30 of each of the cores 300, 305, 310, 315, and 320 includes one or more windings inductively coupled thereto. In particular, it is noted that each pair of adjacent cores is interconnected by a coupling winding. Thus, winding lead 301 extending between the cores 300 and 305 is a part of the coupling winding extending therebetween. In FIG. 3 the numerals 2 and 1 near the respective ends of the lead 301 are intended to indicate that the coupling winding of which the lead 301 is a part includes, for example, twice as many turns on the leg 40 of core 300 as on the leg 10 of core 305. In this way, it is possible to obtain a flux gain or a flux transfer without loss between thes cores 300 and 305 of the circuit shown in FIG. 3. Also, by means of the coupling windings 302, 303, and 304, it is possible to obtain a flux gain between adjacent ones of the cores 305, 310, 315, and 320. This flux gain technique is well known in the art. See, for example, in this connection pages 7–11 of my article entitled "Integrated Magnetic Circuits for Synchronous Sequential Logic Machines," in the Bell System Technical Journal, volume 39, March 1960.

Input information can be applied to the cores 300, 305, 310, 315, and 320 of the FIG. 3 circuit from either a serial signal source 303 or a parallel signal source 304. Assume, for example, that appropriate signals are supplied by the source 304 to the input leg 10 of each of the cores 300, 305, 310, 315, and 320 to set them initially to the representation "0," "0," "1," "1," and "0," respectively, the corresponding flux conditions of the legs 10, 20, 30, and 40 of the five cores being depicted in the top or first row of FIG. 4. It is not necessary to show the flux states of the interconnecting members 60 and 70 in FIG. 4 since these are automatically determined by the flux conditions of the legs of the cores and by the condition of flux continuity within a core.

Subsequently, as described in detail hereinbelow, the representations of the cores 300, 305, 310, 315, and 320 are shifted to the right in a step-by-step manner in response to a four-phase clock signal sequence supplied by sources 306, 307, 308, and 309 under the control of a master clock signal source 311. As the result of a complete cycle of operation of the circuit shown in FIG. 3, the initial representation of the cores 300, 305, 310, 315, and 320 is applied in serial form to utilization circuit 312. Alternatively, the representation in the register may be applied in parallel form to utilization circuit 313.

To begin a cycle of operation, the cores 300, 305, 310, 315, and 320 shown in FIG. 3 are primed by a $P_1$ signal from the source 306. This signal is coupled to the leg 20 of each of the cores and acts to set (or maintain) each of the legs 20 in the positive (i.e., upwards) magnetization direction. The amplitude of the $P_1$ signal is selected to exceed the threshold for switching flux around the short path including legs 20 and 30. Therefore, a flux reversal between these two legs takes place in a core storing a "0" representation. The amplitude of the $P_1$ signal is not, however, sufficient to exceed the threshold for switching flux around the longer path including legs 20 and 10.

The second row of FIG. 4 depicts the magnetization states of the cores 300, 305, 310, 315, and 320 subsequent to the application thereto of a $P_1$ signal. Note that the states of the "1" cores 310 and 315 are unchanged as a result thereof because the legs 20 thereof do not have any flux available for reversal. On the other hand, the initial condition of each of the cores 300, 305, and 320 is such that there is flux available for reversal in the path thereof which includes the legs 20 and 30. Hence, the $P_1$ signal reverses the magnetization condition of the legs 20 and 30 of each of the cores 300, 305, and 320. This is evident by noting that the arrows representative of the magnetization conditions of the legs 20 and 30 in the first, second, and fifth columns of the second row of FIG. 4 are respectively opposed to the arrows immediately thereabove.

Before considering the response of the FIG. 3 circuit to an $A_1$ signal, it is noted that numerous variations are possible in the manner in which the cores of such a circuit may be driven by a four-phase clock signal sequence. Thus, for example, instead of being applied to the leg 20 of each core, the $P_1$ signal may alternatively be applied to drive the legs 30 and 40 of each core downwards. In that case the amplitude of the $P_1$ signal is selected to be sufficient to exceed the threshold for switching flux around the path which includes the legs 30 and 20 but insufficient to exceed the threshold for switching flux around the path which includes the legs 30 and 10. Note also that $P_1$ in this case acts to maintain the existing downwards setting of leg 40 only, thus inhibiting any possible flux reversal between legs 30 and 40. For a given core geometry the current margins imposed on the $P_1$ signal are thereby improved. Or, for a given set of current margins, the diameter of the aperture 110 relative to that of the aperture 120 could be thereby reduced.

Next, and $A_1$ signal is applied from the source 307 to the legs 10 and 40 of each of the cores 300, 305, 310, 315, and 320. This signal tends to produce a positive (i.e., upwards) magnetization in each of the legs 10 and to maintain the existing negative (i.e., downwards) magnetization of each of the legs 40. The amplitude of the $A_1$ signal is selected to be at least sufficient to exceed the threshold for switching between the legs 10 and 20, taking into account any opposing magnetomotive force produced by currents induced in the coupling windings by flux changes in the legs 10. There are, however, no restrictions on the maximum amplitude of $A_1$ except to reasonably limit any reversible flux excursions in the legs 10 and 40 that may be produced because of a non-ideal "squareness" of the rectangular hysteresis loop of a practical core material.

Since the legs 10 of the cores 300, 305, and 320 are already magnetized in the positive direction, the $A_1$ signal produces no significant flux change in these cores. On the other hand, the $A_1$ signal reverses the magnetization of the flux path in each of the cores 310 and 315 which includes the legs 10 and 20. This is evident by noting that the arrows representative of the magnetization conditions of the legs 10 and 20 in the third and fourth columns of the third row of FIG. 4 are respectively opposed to the arrows immediately thereabove.

It is noted that the flux reversal in leg 10 of each of the cores 310 and 315 in response to the $A_1$ signal induces a current in the inter-core coupling winding which extends between leg 10 of the core 310 and leg 40 of the core 305, and in the inter-core coupling winding which extends between leg 10 of the core 315 and leg 40 of the core 310. This tendency to propagate information in the backward direction, i.e., to drive leg 40 of each of the cores 305 and 310 in a positive magnetization direction, is, however, effectively inhibited by the action of the $A_1$ signal on leg 40 of each of the cores 305 and 310, for, as noted above, the $A_1$ signal acts to maintain the existing negative magnetization of the legs 40 of all five cores 300, 305, 310, 315, and 320.

Subsequently, the output or right-hand aperture of each of the cores represented in FIG. 3 is primed by applying to each of the legs 40 a $P_2$ signal from the source 308, which acts to reverse the negative magnetization states of these legs. The amplitude of the $P_2$ signal is selected to be greater than the threshold for switching between legs 40 and 30 but less than the threshold for switching between legs 40 and 20. Therefore, the magnetization conditions of the legs 30 and 40 of the "1" cores 310 and 315 are respectively reversed in response to a $P_2$ signal, while the magnetization conditions of the legs 30 and 40 of each of the "0" cores 300, 305, and 310 are left undisturbed as a result thereof. The conditions of the five cores following a $P_2$ signal are depicted in the fourth row of FIG. 4.

The flux reversal in leg 40 of each of the cores 310 and 315 in response to the $P_2$ signal induces a current in the inter-core coupling winding which extends between leg 40 of the core 310 and leg 10 of the core 315, and in the winding which extends between leg 40 of the core 315 and leg 10 of the core 320. These induced currents produce magnetomotive forces in the direction of existing magnetization of the legs 10 of the cores 315 and 320, thereby producing no significant flux change therein. These induced currents do, however, oppose the switching action of $P_2$ and reduce the net magnetomotive forces on legs 40 of the cores 310 and 315. Therefore, the magnitudes of the induced currents should be reduced as far as possible by making the resistances of these coupling windings as large as possible, compatible with the gain provided by the turns-ratio thereof to compensate for losses in the subsequent transfer operation described below. Practically, the optimum resistance is generally provided by appropriate choice of the diameter and length of wire used for the coupling winding.

Finally, the application of an $A_2$ signal from the source 309 to the leg 40 of each of the cores 300, 305, 310, 315, and 320 clears the right-hand section of each of the cores 310 and 315 and transfers the "1" representations formerly stored therein to the left-hand sections of the respective adjacent cores 315 and 320. Specifically, the $A_2$ signal acts to reset the legs 40 of the cores 310 and 315 to their negative (downwards) magnetization states, while maintaining the existing negative magnetizations of the legs 40 of the cores 300, 305, and 320. By selecting the amplitude of the $A_2$ signal to exceed the threshold for switching between the legs 30 and 40, taking into account the opposing magnetomotive force produced by the current induced in the inter-core coupling winding, a flux reversal is produced in each of the cores 310 and 315 in the path which includes the legs 30 and 40.

The flux changes in the legs 40 of the cores 310 and 315 in response to an $A_2$ signal induce currents in the inter-core coupling windings which include the leads 303 and 304. These currents flow in a direction to reverse the magnetization of the legs 10 of the cores 315 and 320, thereby inserting "1" representations therein. As mentioned above, the turns ratio of each of the coupling windings provides the flux gain needed to compensate for transfer losses. The result is that a "1" is transferred from core 310 to core 315 and from core 315 to core 320, and full switching output voltages are induced in each of the windings connecting cores 310 and 315 to the utilization circuit 313.

The action of $A_2$ on cores 300, 305, and 320 is to maintain the existing negative magnetization of legs 40 of these cores so that no large transfer current is induced in the corresponding output windings, with the result that a "0" is effectively transferred from core 300 to core 305 and from core 305 to core 310 and zero output is induced in the winding connecting core 320 to the utilization circuit 312. Similarly zero outputs are induced in the windings connecting cores 300, 305, and 320 to the utilization circuit 313. Any small current that may be induced in these output windings as a result of reversible flux changes in the legs 40 (attributable to the non-ideal rectangular hysteresis loop of a practical core material) will be effectively absorbed by the inductance and dissipated in the resistance of the output windings.

The final representation of the cores 300, 305, 310, 315, and 320 in response to the above-specified four-phase clock signal sequence is shown in the bottom row of FIG. 4. It is assumed that a "0" input is provided by the serial input source 303 into core 300 during or immediately following the $A_2$ signal. A "1" could have equally well been inserted into core 300 at this time. In an exactly similar manner the word stored in the shift register depicted in FIG. 3 is transferred one further digit to the right following the completion of each $P_1$, $A_1$, $P_2$, and $A_2$ signal sequence.

As noted hereinabove, a binary "0" signal is represented by positive magnetization of the leg 10 of a core of the type included in FIG. 3, while a "1" indication is represented by negative magnetization of the leg 10 thereof. For either a "1" or a "0" representation, the leg 40 is magnetized in the negative or downwards direction. The legs 20 and 30 serve only to provide closure within the core for the fluxes from the legs 10 and 40. Both of the legs 20 and 30 are magnetized upwards if the core has a "1" stored therein. However, the settings of the legs 20 and 30 are unimportant in a core containing a "0." It is only necessary that their magnetizations satisfy the requirement for flux closure taking into account the magnetizations of the legs 10 and 40.

For convenience it was assumed above that the leg 20 of each of the "0" cores 300, 305, and 320 was initially magnetized downwards and that leg 30 was magnetized upwards, as indicated in the first, second, and fifth columns of the first row in FIG. 4. By contrast it is noted that the final "0" representation of each of the cores 300 and 305 (in the fifth row of FIG. 4) include a positively magnetized leg 20 and a negatively magnetized leg 30. On the other hand, in the final "0" representation of the core 310, the leg 20 thereof is magnetized in a negative direction and the leg 30 in a positive direction. It is, however, again noted that the magnetizations of the legs 20 and 30 in a "0" core are unimportant. This is due to the fact that a subsequent $P_1$ signal applied to a "0" core causes the legs 10 and 20 thereof to be each magnetized in a positive direction and the legs 30 and 40 thereof to be each magnetized in a negative direction, regardless of which type of "0" representation the core initially had stored therein.

A new binary digit may, for example, be inserted serially into the first core 300 of the register shown in FIG. 3 during or immediately following each $A_2$ signal. In addition, the serial output from the right-hand or output core 320 may, of course, be used to provide the input to additional stages of the type of the five depicted in FIG. 3 and described in detail herein. Also, a new word may be written into the register shown in FIG. 3 during the application thereto of an $A_2$ signal by using the parallel input windings 370, 371, 372, 373, and 374 coupled to the parallel signal source 304.

In order to increase the operational minimum and maximum margins for $P_1$ signals, the geometry of each of the herein-described cores should be such that the mean flux path length for switching between legs 10 and 20 is greater than that between legs 20 and 30. The ratio of the maximum and minimum drive signals is determined by and ideally approximately equal to the ratio of the flux path lengths. Practically what this means is that the diameter of the aperture between the legs 10 and 20 should be larger (for example, by a factor of 2) than the diameter of the aperture between the legs 20 and 30.

In addition, to increase the operational minimum and maximum margins for $P_2$ signals, the geometry of each of the cores described herein should be such that the mean flux path length for switching between legs 20 and 40 is greater than that between legs 20 and 30. As a practical matter this means that the diameter of the aperture bordered by legs 20 and 30 should be larger (for example, by a factor of one and one-half) than the diameter of the aperture between the legs 30 and 40. This ratio of the diameters of the apertures 120 and 130 results in about the same switching path length differential between the legs 20 and 30 and the legs 30 and 40 as exists between the legs 10 and 20 and the legs 20 and 30 for the above-specified difference in the diameters of the apertures 110 and 120. These above-mentioned general dimensions for the apertures 110, 120, and 130 are the ones depicted in FIGS. 1A, 2A, and 2B.

Because of the gain provided by the turns ratio of the inter-core coupling windings of the illustrative shift register circuit shown in FIG. 3, each core thereof can be used to drive a number of other core structures in addition to the core structure of the next immediately adjacent stage. Thus, utilization circuit 313 may, for example, contain a plurality of cores driven from an appropriate winding on leg 40 of each of the cores 300, 305, 310, 315, and 320. Alternatively, as noted above, the utilization circuit 313 can simply be used to provide a parallel readout of the information stored in the five cores of the shift register circuit, with an output voltage corresponding to that induced by a full reversal of the flux in leg 40 occurring during the $A_2$ phase if the core contained a "1" immediately prior to the $A_2$ phase, and essentially zero output voltage occurring if the core contained a "0."

The technique for shifting digital information signals from core to core in a sequential circuit has been described. In order to obtain greater logical flexibility, additional combinational logic operations may be introduced coincident with the shifting operation. This may be done by employing cores having a more complicated input structure to replace leg 10 of a core of the type shown in FIGS. 1A, 2A, and 2B. For example, one or more additional apertures may be introduced in the input portion of the core to make possible combinational operations by flux steering techniques. Suitable design information for this purpose is described on pages 331–332 of my aforecited Bell System Technical Journal article and, in addition, in two other of my articles: "Possibilities of All-Magnetic Logic," Journal of Applied Physics, Volume 32, pages 31–33, March 1961; and "All-Magnetic Logic," Solid State Journal, volume 2, pages 24–27, August 1961.

It is noted that my copending application Serial No. 204,683, filed concurrently herewith, is directed to a four-hole magnetic core device which is related to the subject matter hereof.

It is to be understood that the above-described arrangements are only illustrative of the application of the principles of the present invention. Numerous other arrangements may be devised by those skilled in the art without departing from the spirit and scope of the invention. For example, the teachings contained hereinabove concerning the relative flux capacities and aperture sizes of the specific core device depicted in FIGS. 1A, 2A, and 2B may be embodied in a variety of modifications thereof each of which is within the scope of the principles of the present invention. Illustratively, a rectangular core with rectangular holes therethrough can easily be devised in view of the teachings set forth herein.

What is claimed is:

1. In combination in a magnetic shift register circuit, a plurality of cores arranged in a linear array, each of said cores being made of a rectangular hysteresis loop material and having three apertures therethrough which define four substantially parallel flux-carrying legs including an input leg and an output leg, means for setting said cores to an initial binary representation, inter-core winding means characterized by a step-down turns ratio coupling the output leg of one core to the input leg of the next adjacent core of said array, and four-phase clock signal means coupled to said cores for advancing said initial representation from core to core in a digit-by-digit manner, said four-phase clock signal means including first winding means comprising a winding inductively coupled in a first winding direction to the leg immediately adjacent the input leg of each core of said array, said four-phase clock signal means further including second winding means comprising a winding inductively coupled in the first winding direction to the input leg of each core of said array and a winding inductively coupled in the opposite winding direction to the output leg of each core of said array.

2. A combination as in in claim 1 wherein said four-phase clock signal means further includes third winding means comprising a winding inductively coupled in the first winding direction to the output leg of each core of said array.

3. A combination as in claim 2 wherein said four-phase clock signal means still further includes fourth winding means comprising a winding inductively coupled in the opposite winding direction to the output leg of each core of said array.

4. A combination as in claim 3 wherein said four-phase clock signal means includes means for applying signals to said first, second, third and fourth winding means in sequence in the listed order.

5. A core element comprising a body of material exhibiting a substantially rectangular hysteresis loop characteristic, said body having three apertures therein defining four substantially parallel flux-carrying legs whose minimum cross-sectional areas are substantially equal to each other, said three apertures comprising an input aperture, an output aperture and an intermediate aperture, the area of said intermediate aperture being approximately equal to one-quarter that of said input aperture and two and a quarter times that of said output aperture, said body also including two side members respectively interconnecting the ends of said four substantially parallel legs to form a plurality of closed magnetic paths in said body, the portions of said side members which interconnect the respective ends of the two middle legs each having a minimum cross-sectional area substantially equal to twice the cross-sectional area of each of said legs.

References Cited in the file of this patent

UNITED STATES PATENTS

| | | |
|---|---|---|
| 2,935,739 | Crane | May 3, 1960 |
| 3,004,245 | Crane et al. | Oct. 10, 1961 |
| 3,034,108 | Bennion | May 8, 1962 |
| 3,077,584 | Eschenfelder | Feb. 12, 1963 |